(12) United States Patent  (10) Patent No.: US 7,889,119 B2
Evers et al.  (45) Date of Patent: Feb. 15, 2011

(54) RADIAL GAP MEASUREMENT ON TURBINES

(75) Inventors: Daniel Evers, Otterfing (DE); Andreas Ziroff, München (DE)

(73) Assignee: Siemens Aktiengesellschaft, Munich (DE)

( * ) Notice: Subject to any disclaimer, the term of this patent is extended or adjusted under 35 U.S.C. 154(b) by 216 days.

(21) Appl. No.: 12/309,328

(22) PCT Filed: Jul. 19, 2007

(86) PCT No.: PCT/EP2007/057465

§ 371 (c)(1),
(2), (4) Date: Jan. 13, 2009

(87) PCT Pub. No.: WO2008/009717

PCT Pub. Date: Jan. 24, 2008

(65) Prior Publication Data

US 2009/0289832 A1 Nov. 26, 2009

(30) Foreign Application Priority Data

Jul. 19, 2006 (DE) .................... 10 2006 033 461

(51) Int. Cl.
*G01S 13/08* (2006.01)
*G01S 13/58* (2006.01)
*G01M 19/00* (2006.01)

(52) U.S. Cl. .................... 342/118; 342/104; 342/109; 342/114; 73/112.01

(58) Field of Classification Search ............ 342/70–72, 342/104, 109, 114, 118; 701/99–115; 73/1.27, 73/1.28, 112.01, 112.02, 112.03, 112.04, 73/112.05, 112.06; 477/30
See application file for complete search history.

(56) References Cited

U.S. PATENT DOCUMENTS 3,199,103 A * 8/1965 Augustine .................... 342/127
3,544,923 A * 12/1970 Williams .................... 333/22 R (Continued)

FOREIGN PATENT DOCUMENTS

DE 3044242 C2 9/1981

(Continued)

*Primary Examiner*—Thomas H Tarcza
*Assistant Examiner*—Peter Bythrow

(57) ABSTRACT

Radial gap measurement on turbines by a microwave measuring method and an evaluation of a Doppler effect which varies according to the size of the radial gap is described. At least one radar sensor embodied as a transmission and reception unit is provided in the wall of a turbine housing which is radially oriented towards the centre of the turbine. The relative speed of an outer end of a turbine blade, dependent on the size of the radial gap, is evaluated many times in relation to the radar sensor during the passage of the blade end past the same, and the course of the relative speed over time on the zero crossing constitutes a measure for the radial gap on the basis of the relation between the absolute value of the relative speed and the incline thereof in the zero crossing.

6 Claims, 2 Drawing Sheets

U.S. PATENT DOCUMENTS

| | | | | |
|---|---|---|---|---|
| 3,551,199 A * | 12/1970 | Forster | | 427/521 |
| 3,553,413 A * | 1/1971 | Soulier | | 219/695 |
| 4,131,889 A * | 12/1978 | Gray | | 342/114 |
| 4,326,804 A * | 4/1982 | Mossey | | 356/623 |
| 4,384,819 A * | 5/1983 | Baker | | 415/14 |
| 4,384,849 A * | 5/1983 | Marchetti | | 432/197 |
| 4,413,519 A * | 11/1983 | Bannister et al. | | 73/660 |
| 4,507,658 A * | 3/1985 | Keating | | 342/118 |
| 4,644,270 A * | 2/1987 | Oates et al. | | 324/207.25 |
| 4,700,127 A * | 10/1987 | Sasaki et al. | | 324/633 |
| 5,479,826 A * | 1/1996 | Twerdochlib et al. | | 73/660 |
| 5,818,242 A | 10/1998 | Grzybowski et al. | | 324/642 |
| 6,445,995 B1 * | 9/2002 | Mollmann | | 701/100 |
| 6,487,491 B1 * | 11/2002 | Karpman et al. | | 701/100 |
| 6,489,917 B2 * | 12/2002 | Geisheimer et al. | | 342/127 |
| 6,584,849 B2 * | 7/2003 | Loftus et al. | | 73/659 |
| 6,856,281 B2 * | 2/2005 | Billington et al. | | 342/174 |
| 7,083,384 B2 * | 8/2006 | Bosselmann et al. | | 416/146 R |
| 7,095,221 B2 * | 8/2006 | Bosselmann et al. | | 324/71.1 |
| 7,246,991 B2 * | 7/2007 | Bosche | | 415/14 |
| 7,373,823 B2 * | 5/2008 | Bosselmann et al. | | 73/620 |
| 7,424,823 B2 * | 9/2008 | Teolis et al. | | 73/112.01 |
| 7,455,495 B2 * | 11/2008 | Leogrande et al. | | 415/1 |
| 7,483,800 B2 * | 1/2009 | Geisheimer et al. | | 702/77 |
| 7,486,248 B2 * | 2/2009 | Halek et al. | | 343/770 |
| 2004/0057828 A1 * | 3/2004 | Bosche | | 416/1 |
| 2005/0024284 A1 * | 2/2005 | Halek et al. | | 343/771 |
| 2005/0088171 A1 * | 4/2005 | Gualtieri | | 324/207.26 |
| 2008/0255799 A1 * | 10/2008 | Pfeifer et al. | | 702/159 |
| 2009/0146897 A1 * | 6/2009 | Halek et al. | | 343/770 |
| 2010/0005870 A1 * | 1/2010 | Bachmaier et al. | | 73/114.62 |

FOREIGN PATENT DOCUMENTS

| | | |
|---|---|---|
| DE | 101 19 669 A1 | 10/2002 |
| EP | 0118079 A1 | 9/1984 |
| EP | 1617174 A1 | 1/2006 |
| GB | 2 065 410 A | 6/1981 |
| WO | 2005014757 A2 | 2/2005 |
| WO | WO 2006/005690 A1 | 1/2006 |

* cited by examiner

RADIAL GAP MEASUREMENT ON TURBINES

CROSS REFERENCE TO RELATED APPLICATIONS

This application is the U.S. National Stage of International Application No. PCT/EP2007/057465 filed Jul. 19, 2007 and claims the benefit thereof. The International Application claims the benefits of German application No. 10 2006 033 461.2 DE filed Jul. 19, 2006, both of the applications are incorporated by reference herein in their entirety.

FIELD OF INVENTION

The invention relates to checking the radial gap present between the outer ends of the turbine blades and the housing on turbines.

BACKGROUND OF INVENTION

Radar sensor technology is now very widespread in process automation and monitoring. Radar technology enables the speed, position and presence of a material reflecting microwaves to be measured directly.

In the power station field there is the requirement for optimum dimensioning of the radial gap on turbines. To this end it is necessary to monitor the radial gap. The definition of "radial gap" is expressed by the space between the outer end of turbine blades and the turbine housing. If this gap is large during the operation of the turbine, a part of the working gas, of which the energy should actually be taken up by the turbine blades, will flow as a secondary flow and thus as a loss flow through this gap and will reduce the efficiency of the turbine. With large turbines especially, such deteriorations in efficiency, even of only a few tenths of a percent, are clearly reflected in the fuel costs.

It is therefore of commercial and technological interest to be able to determine with great accuracy the radial gap of turbines during operation. In the past contact-based measurement processes were generally employed. Such measurement methods are nowadays already at a high level of development. At the same time however inherent disadvantages exist with these methods which should have been rectified in the interim. There is a natural interest in non-contact measurement methods in this area.

Of the known methods there are essentially three different systems to be mentioned which deal with determining the gas turbine radial gap during operation.

The oldest method uses a wear pin made of a soft material which is introduced into the turbine housing until it contacts individual turbine blades. This mechanical method has the disadvantage of high wear and inadequate measurement options. In this case only the blade projecting furthest outwards, i.e. the blade with the minimum radial gap is detected.

In a further development there is the above-mentioned system with electromechanical actuator. A disadvantage associated with said method lies in using a component subject to wear and the inherent necessity of using mechanical elements.

A fundamentally different measurement principle is based on a capacitive proximity sensor which eliminates a few of the disadvantages of the previously mentioned systems. With this method measurement errors occur which are also a function of the blade geometry. In addition the possible measurement accuracy is very limited.

SUMMARY OF INVENTION

An object of the invention is to provide a measurement method which is contactless if possible for measuring the radial gap on turbines which avoids disadvantages from the prior art. This object is achieved by the combination of the features in accordance with the independent claim. Advantageous embodiments can be taken from the dependent claims.

The invention initially uses a microwave-based measurement method for determining the radial gap. In addition a Doppler method is employed for evaluation. The instantaneous relative speed dependent on the radial gap, i.e. the speed between for example a blade end relative to the radar sensor, is evaluated in different phases of the passage of the turbine blade past the radar sensor which is in a stationary location in the turbine wall. The evaluation of the characteristic time-dependent value of the instantaneous speed is the important factor. This curve is recorded and evaluated many times over the course of time, with the corresponding radar sensor receiving the reflected radar microwaves emitted at scatter centers, for example the outermost end of a turbine blade, at the sensor and these subsequently being evaluated. Based on these speeds of the relative speeds evaluated at different moments it is possible to determine the position of an individual destination at a specific point in time.

In this case a distinction can advantageously be made between a number of destinations.

BRIEF DESCRIPTION OF THE DRAWINGS

Exemplary embodiments which refer to the accompanying schematic figures and do not restrict the invention in any way are described below.

DETAILED DESCRIPTION OF INVENTION

The present invention uses a microwave measurement, a Doppler method and combines the resulting information to establish the radial gap at a turbine. In such cases the momentary speed depending on the radial gap is evaluated in different phases of the passage of the turbine blade past the sensor fitted into the turbine wall.

It is important for the evaluation of characteristic time-dependent relative speeds to be recorded many times in the area around the passage of a turbine blade past the sensor. In this case the radar sensor sends microwaves and receives waves reflected at scatter centers. Because of relative speed curves it is possible to distinguish a number of destinations from each other The primary methodology however is the determination of the position of an individual destination at a specific point in time, for example the position of the outermost end of a turbine blade relative to the transmitter.

In relation to the details of the methodology for radial gap measurement it should be noted that, as the blade passes a sensor located a few millimeters from it in the wall of the turbine, the speed the blade or a blade tip relative to this sensor at the point of the greatest proximity becomes zero. This plausible phenomenon is now evaluated such that the precise curve of the speed is evaluated as a function of time. If the radial gap is very small or in the limit case equal to zero, the relative speed at the point of the greatest proximity of the turbine blade tip to the radar sensor will change very quickly and simultaneously suddenly change its leading sign. If the tip of the turbine blade or its outermost end passes at some distance from the sensor, the relative speed changes suddenly with a final slope at the zero crossing point or on the change of leading sign of the relative speed. The absolute value of the speed which is able to be determined via the Doppler displacement is then related to the incline of the relative speed in the zero crossing. The result is a measure of the minimum gap and thus of the radial gap.

Figure 1:
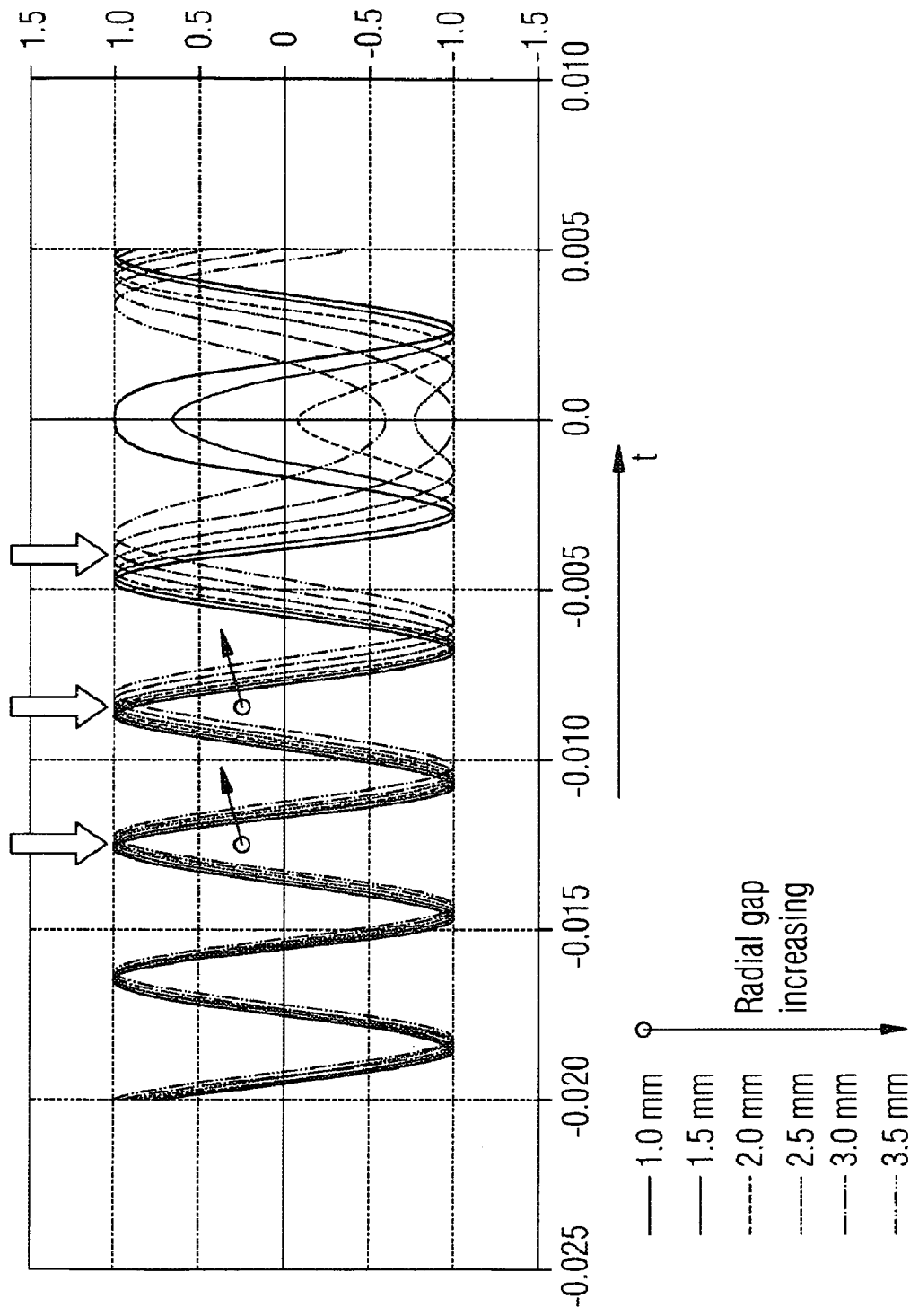
FIG. 1 shows the timing curve of the Doppler displacement for turbines.

FIG. 1 shows the timing curve of the Doppler displacement for turbines. With an increasing or larger radial gap the accordingly shown oscillations shift in accordance with the arrows from left to right. The diagram shows an evaluation of Doppler effects and a strong dependency on the radial gap can be seen. A measurement accuracy of for example 9.2 mm is able to be implemented. A microwave measurement can for example be performed with a sensor, which preferably operates at 77 GHz. A significant determinant for the accuracy of a Doppler sensor or a sensor which is evaluated with a Doppler method is the operating frequency. And the higher the operating frequency is, the faster the phase of the receiver signal runs for a given speed of the destination object. The higher the operating frequency, the smaller the measurement time or the speed resolution of the destination can then be. For this reason, for the application shown, it is advisable for technical reasons to particularly also employ solutions at 77 GHz. However this does not represent any kind of restriction for a microwave transmission and reception system; other radar frequencies can also be used.

It should be pointed out in general that an appropriate inventive radar sensor to be employed for the radial gap measurement emits a microwave signal which naturally "illuminates" a detection volume which as a rule is predetermined. Since the application described here by way of example represents a measurement in the near area from radar standpoints, a very wide radiating antenna will be needed to detect a sufficiently large section from the track of an outermost end of a turbine blade. Parts of the radar signal are reflected at one of these destinations and are accepted again by the sensor. In this case sensor and receiver signal are subsequently mixed with each other. The mixed signal encodes the relative phase shift between sent and received signal. This phase difference signal depends on the delay of the signal from the sensor to the destination and back again. If sensor and receiver signal are now in phase for example, a normal mixer delivers a comparatively large amplitude of the mixed signal. With phase-opposed signals the mixer delivers a relative minimum of the output amplitude. If the phase of the receiver signal is now continuously tuned, as can be achieved by a relative movement of the destination for example, maxima and minima alternate in time and a mixed signal is produced with periodic components, the frequency of which is proportional to the speed of the relative displacement between sensor and destination.

Figure 2:
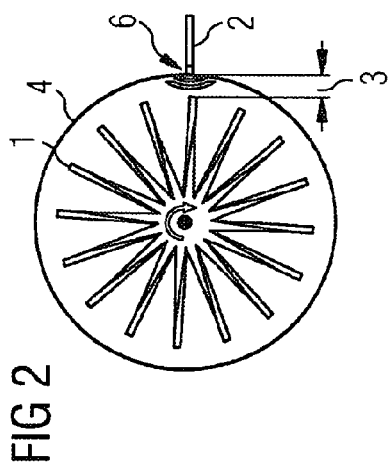
FIG. 2 shows a section through a turbine with turbine housing indicated and the approximate relative positions between radial gap and radar sensor, FIGS. 3 and 4 each show the relative speeds as a function of the time.

FIG. 2 shows the relationships in a turbine. The turbine blades running in a turbine housing 4 rotate in a clockwise direction in accordance with the arrow shown in the figure. A radar sensor 2 is built into a hole made through the housing wall. The problem consists of measuring a radial gap 3 at the point at which the sensor 2 is mounted. In this case essentially only the outermost ends 1 of a turbine blade are sought and calibrated as a destination. The sensor 2 is radial, i.e. oriented towards the center point of the turbine, but does not end with the inner surface of the housing 4. Instead the measurement window 6 is tightly closed off by a seal which does not impede the propagation of microwaves. This can advantageously be a polytetrafluoroethylene or a ceramic material. The sensor itself radiates over a relatively wide area or is connected to an antenna with wide radiation characteristic.

Figure 3:
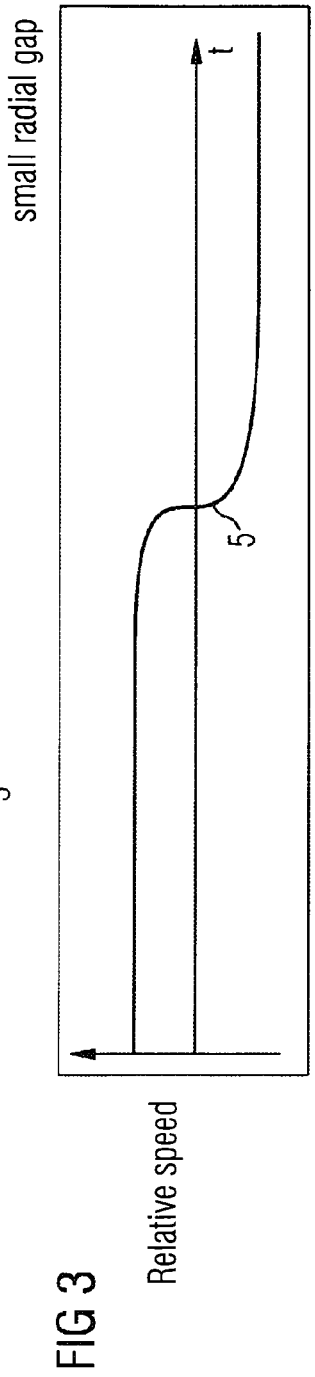
Figure 4:
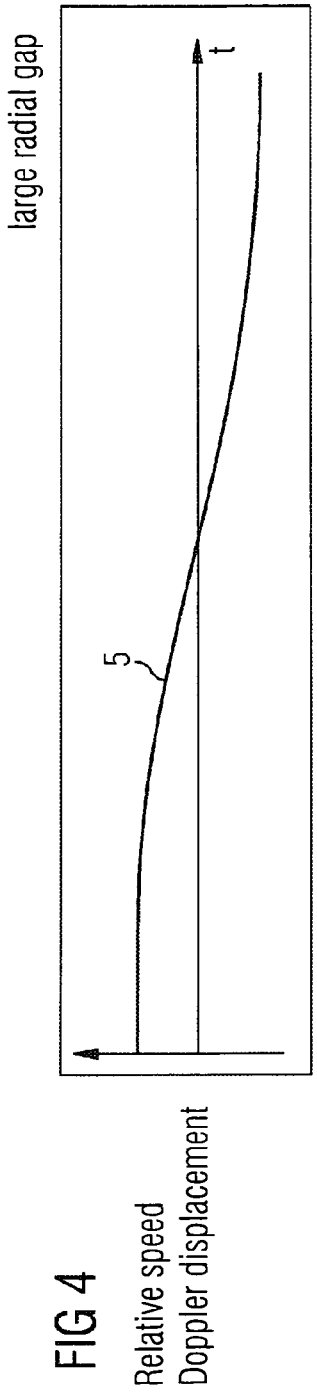

FIGS. 3 and 4 respectively represent for different radial gap sizes the curve of the Doppler displacement or the relative speed respectively. This changes with the passage of the tip of the turbine blade, for example from plus to minus. If the speed at the zero passage now changes its leading sign very abruptly, a smaller radial gap size is present. This is shown schematically in FIG. 3. The similarly schematic diagram depicted in FIG. 4 also shows the Doppler displacement 5 in the same time window, in which case however for large radial gaps the zero passage of this Doppler displacement or the relative speed occurs with a very much flatter incline.

Advantages of the invention primarily involve the contactless measurement of the radial gap with high accuracy. In addition this technique allows further process variables to be accepted which are for example important for machine diagnostics. A significant advantage of the method of operation consists especially of the detection of destinations in the absolute near area, which cannot be undertaken with Doppler-based methods alone.

A significant advantage of a described method lies in the fact that, as well as the turbine blades with the smallest radial gap, turbine blades with a larger radial gap can be measured and are thus able to be detected at all.

The invention claimed is:

1. A microwave measurement method of radial gap measurement on turbines and an evaluation of a Doppler effect which varies with the size of a radial gap of a turbine, with a radar sensor embodied as a transmission and reception unit provided in a wall of a turbine housing which is radially oriented towards the center of the turbine, comprising:

evaluating a relative speed of an outer end of a turbine blade dependent on the size of the radial gap in relation to the radar sensor during the passage of the blade end past the radar sensor; and constituting, by the course of the relative speed over time on zero crossing, a measure for the radial gap based upon the relation between an absolute value of the relative speed and the incline thereof in the zero crossing.

2. The method as claimed in claim 1, wherein the relative speed of the outer end of the turbine blade in relation to the radar sensor during the passage of the blade end past the radar sensor is evaluated many times.

3. The method as claimed in claim 1, wherein a plurality of measurement destinations are differentiated from one another.

4. The method as claimed in claim 1, wherein the operating function of the radar sensor is approximately 77 GHz.

5. The method as claimed in claim 1, wherein a measurement window is sealed off from an inner side of the turbine with polytetrafluoroethylene (PTFE).

6. The method as claimed in claim 1, wherein a measurement window is sealed off from an inner side of the turbine with a ceramic material.

* * * * *